UNITED STATES PATENT OFFICE.

JOSHUA BARNES, OF BROOKLYN, NEW YORK.

YEAST-CAKE.

SPECIFICATION forming part of Letters Patent No. 413,886, dated October 29, 1889.

Application filed July 7, 1888. Serial No. 279,312. (No specimens.)

*To all whom it may concern:*

Be it known that I, JOSHUA BARNES, of Brooklyn, in the county of Kings and State of New York, have invented a certain new and useful Improvement in Yeast-Cakes, of which the following is a specification.

The object of my present improvement is to provide for maintaining yeast-cakes in a serviceable condition for a longer time than it is possible to maintain them when they are put upon the market in the ordinary manner.

My improvement consists in a new article of manufacture consisting of a yeast-cake coated with a substance which will serve to protect it from the deteriorating effects which would be incident to the contact of the atmosphere with it.

In carrying out my improvement the yeast-cakes may be made in the ordinary manner, or any other suitable manner. Before having the coating applied to them they will be brought to the proper condition to receive the coating. They will be dipped into the material which is to form the coating, or the coating may be applied in any other approved way. The coating material which I prefer to use consists of a solution of sugar. The sugar will preferably be very fine cane-sugar dissolved in water. It may have a quantity of gum added in order to produce the best results. I deem it best to apply the coating while cool. After the application of the coating it will be allowed to harden. The hardening may be effected by exposure to the atmosphere.

A yeast-cake having such a coating as I have referred to may be preserved for a long period of time without deterioration due to the effect of the atmosphere, or dampness, or heat resulting in evaporation.

As the time during which a yeast-cake will remain capable of serviceable use is prolonged, the expense of the business of supplying the market with yeast-cakes is very materially reduced, and for this reason the yeast-cakes can be sold very cheaply. This is not, however, perhaps the most important advantage. As yeast-cakes are ordinarily put upon the market it is impracticable for the purchasers to ascertain the strength of the yeast-cakes before using them. As yeast-cakes vary throughout wide limits in respect to strength, in accordance with their ages, purchasers are often deceived as to the strength of yeast-cakes purchased by them, and are unable to reliably determine in advance what quantity of a given yeast-cake or number of yeast-cakes will be requisite for accomplishing the purpose desired by them.

Yeast-cakes made according to my improvement will be of substantially standard quality for a very long period, and hence may be depended upon.

Owing to the long period throughout which my yeast-cakes can be preserved, it is practicable to transport them great distances and to all kinds of climates.

A coating of sugary matter is particularly advantageous, because it does not require to be removed to fit the yeast-cake for use, but will readily dissolve during the use of the yeast-cake. Indeed, the sugar will coact with the yeast to bring about the result desired from the yeast-cakes. The sugar coating may therefore properly be regarded as a component and also as an important part of the yeast-cake.

What I claim as my invention, and desire to secure by Letters Patent, is—

1. As an article of manufacture, a yeast-cake having a coating or envelope of sugary matter, as set forth.

2. As an article of manufacture, a yeast-cake having a hermetically-sealing envelope of sugary matter, as specified.

3. As an article of manufacture, a yeast-cake having its particles sealed and protected from the deleterious effects of the atmosphere by a coating of sugar and gum or equivalent material, as and for the purpose set forth.

JOSHUA BARNES.

Witnesses:
GEO. WADMAN,
FRED KEMPER.